(12) United States Patent
Talacci

(10) Patent No.: US 7,726,105 B2
(45) Date of Patent: Jun. 1, 2010

(54) BAG PACKAGING MACHINE WITH VERTICAL INTERMITTENT OPERATION

(75) Inventor: Roberto Talacci, Rimini (IT)

(73) Assignee: Perfect Pack S.R.L., Rimini (IT)

( * ) Notice: Subject to any disclaimer, the term of this patent is extended or adjusted under 35 U.S.C. 154(b) by 9 days.

(21) Appl. No.: 12/223,574

(22) PCT Filed: Jan. 15, 2007

(86) PCT No.: PCT/IT2007/000027

§ 371 (c)(1),
(2), (4) Date: Aug. 4, 2008

(87) PCT Pub. No.: WO2007/091284

PCT Pub. Date: Aug. 16, 2007

(65) Prior Publication Data

US 2009/0013654 A1    Jan. 15, 2009

(30) Foreign Application Priority Data

Feb. 7, 2006    (IT)    .......................... MC2006A0013

(51) Int. Cl.
*B65B 9/02*    (2006.01)

(52) U.S. Cl. .............................. 53/554; 53/365; 53/451; 53/551; 53/553

(58) Field of Classification Search ................... 53/365, 53/374.6, 451, 551, 553, 554, 548, 574
See application file for complete search history.

(56) References Cited

U.S. PATENT DOCUMENTS

| | | | | |
|---|---|---|---|---|
| 3,210,908 A * | 10/1965 | Samberg | ....................... | 53/546 |
| 4,622,798 A * | 11/1986 | Oki | ........................... | 53/374.8 |
| 4,845,926 A * | 7/1989 | Davis | .......................... | 53/451 |
| 5,511,363 A * | 4/1996 | Doede | ......................... | 53/552 |
| 5,822,949 A * | 10/1998 | Naoi | ............................. | 53/55 |
| 6,761,016 B1 * | 7/2004 | Soleri | .......................... | 53/554 |
| 6,928,794 B2 * | 8/2005 | Hamer et al. | ................. | 53/450 |
| 6,966,166 B2 * | 11/2005 | Kissling | ..................... | 53/451 |

* cited by examiner

*Primary Examiner*—Thanh K Truong
(74) *Attorney, Agent, or Firm*—Hodes, Pessin & Katz, P.A.

(57) ABSTRACT

A bag packaging machine with vertical intermittent operation, which has a sealing station for the opposite pair of films that form the bags, in which two sealing plates operate in opposite position with respect to the symmetrical vertical axis Y-Y of the machine, which are supported with possibility of free sliding by corresponding frames fixed to free shafts that extend from the back to the front of the machine with forward inclination towards the front of the machine.

5 Claims, 5 Drawing Sheets

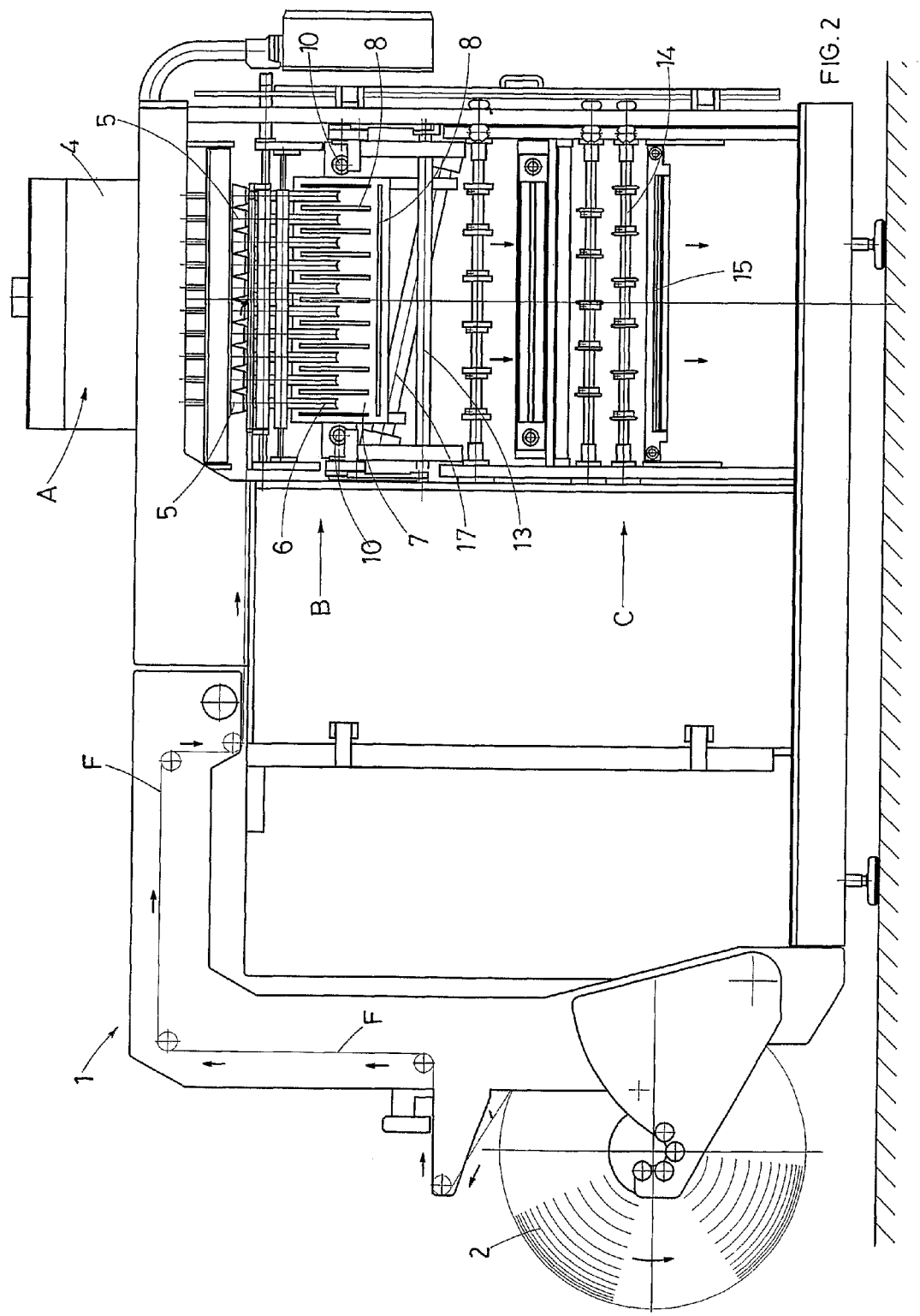

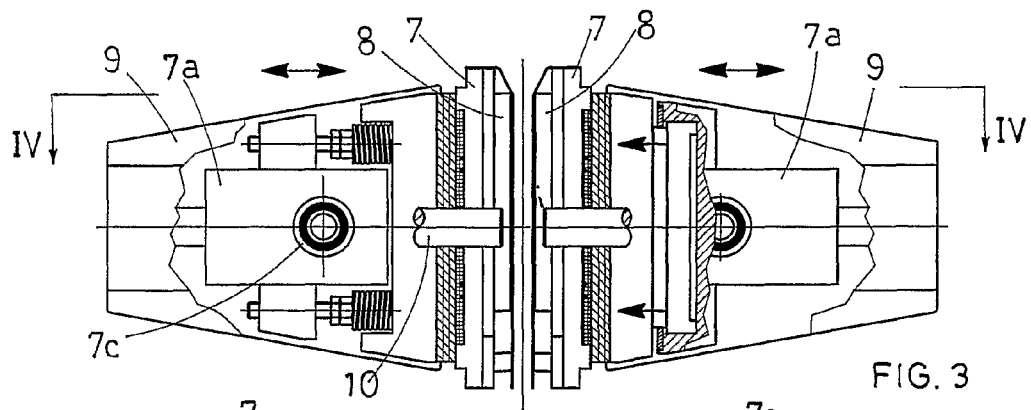
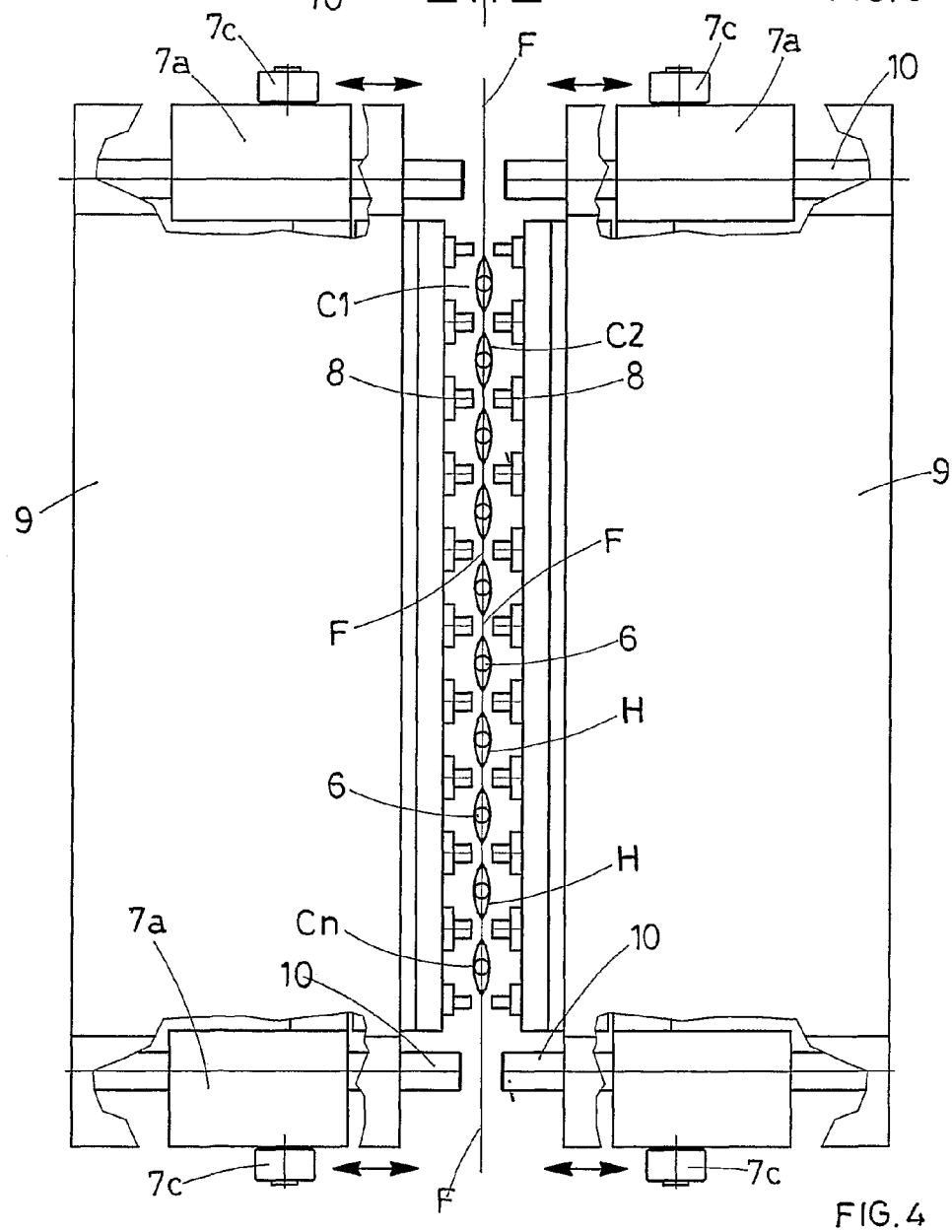

BAG PACKAGING MACHINE WITH VERTICAL INTERMITTENT OPERATION

The present patent application refers to a bag packaging machine with vertical intermittent operation.

The machine of the invention is an improvement of known models of packaging machines, of the type in which the bag is obtained from two thin films cut from a single feeding coil that are taken to the sealing station, in which the said films are positioned vertically one against the other.

The dosing station is positioned above the sealing station and is composed of a parallel series of conveyor hoses that convey the product inside the bag that is being formed, which is sealed on the bottom and on the two vertical sides, and is open on the top where the conveyor hoses end.

The dosing means and systems vary according to the flowing capacities of the product being packaged, which can be dense and fluid, such as mustard, ketchup, cosmetics, or granular and powdery, such as salt or sugar.

The two films are lowered vertically and intermittently through the sealing station, where they remain for the time necessary to be sealed and filled. The sealing of the bottom of the bag that remains in the sealing station before being filled coincides with the sealing of the upper side of the bag below, which has been filled in the immediately previous stop.

A transversal cutting station is positioned downstream the sealing station to cut the transversal seal that separates the line of bags and detach the first bag from the line of bags.

Sealing is obtained by means of hot sealing, since the internal sides of the two films—that is to say the sides that adhere when they pass through the sealing station—are coated with a thin layer of sealing material, usually polyethylene, which melts and seals along the pressed lines when exposed to pressure and temperature.

The sealing station is normally provided with two opposite sealing plates that act as support for the sealing tools, consisting in interchangeable strips or bars, since the length and the distance of the said tools must be adapted from time to time to the dimensions and shape of the bag.

During normal operation the sealing plates are placed in perfectly vertical position, one in front of the other and next to the two films.

In other words, the vertical plane on which the two films are laid and moved is in parallel intermediate position with respect to the two vertical planes on which the sealing tools supported by the two opposite sealing plates are laid.

During normal operation the sealing plates are rhythmically moved closer and pressed one against the other according to a rectilinear movement perfectly synchronised and alternated with the intermittent forward movement of the two films, it being obvious that the two sealing plates are detached when the two films are moving and tightened as soon as the two films stop in the sealing and filling stations.

The sealing plates with actuation mechanism are supported by bearing frames that rotate around pivoting axes in order to be overturned to a maximum angle of 90°, thus spreading the two sealing plates and providing access to the space in which the two films move vertically, one against the other, and the conveyor hoses are positioned.

Access is needed for cleaning, maintenance, repair or regulation of the parts contained in the said space, which becomes a thin vertical space bordered by the opposite closed pair of sealing plates during operation.

The bearing frames with sealing plates must be overturned when the user needs to clean or replace the sealing tools or change their position further to a change in the size of the bag.

Finally, automatic overturning is performed when the machine is stopped during an ordinary work cycle due to malfunctioning detected by safety sensors.

Without the automatic overturning, the product contained in the bag would overheat because of the heat emitted by the opposite close pair of sealing plates around the bag.

Because of overheating, the two films would get softer, thus adhering to the conveyor hoses, with consequent difficult detachment, cleaning and restoration of the films in the sealing station.

The models of bag packaging machines that are currently available on the market can be divided in two groups, the first group with sealing plates overturned around a vertical axis, and the second group with sealing plates overturned around a horizontal axis.

In particular, in the first case the two support frames of the sealing plates are pivoted around vertical axes usually located at the back of the machine and symmetrically spaced from the vertical plane where the two films are laid and moved, so that the spreading of the two sealing plates kinetically corresponds to the opening of two stretched arms in front of the trunk of a standing person.

In the second case the two support frames of the sealing plates are pivoted around horizontal axes located under each plate and symmetrically spaced from the vertical plane where the two films are laid and moved, so that the spreading of the two sealing plates kinetically corresponds to the opening a book, whose pages are positioned on opposite sides on the same horizontal plane.

A machine of the latter type is disclosed in patent EP 0621187.

Compared to the machines with sealing plates overturned around a vertical axis, the machines with sealing plates overturned around a horizontal axis are characterised by better work conditions when cleaning or replacing the sealing tools, which are stably positioned on a horizontal plane that coincides with the surface of the sealing plate, which lays on a horizontal plane when it is overturned and opened.

Vice versa, in the machines provided with sealing plates overturned around a vertical axis, the support surface of the sealing tools remains on a vertical plane, even when the plate is overturned in maximum opening position, in such a way that the sealing tools may fall onto the floor during manipulation.

In any case, also the machines provided with sealing plates overturned around a horizontal axis are not free from drawbacks, the most serious one being the small access to the space where the two films move vertically and where the conveyor hoses are situated, for which cleaning, repair or replacement operations are necessary.

These packaging machines are equipped with a parallel series of multiple conveyor hoses used to fill corresponding lines of bags, in which each line of bags is obtained by sealing an opposite pair of bands cut on the opposite pair of films.

When the two sealing plates are open and overturned in horizontal position, the parallel series of conveyor hoses and the parallel lines of bags are situated in a deep, narrow space with constant width, bordered by the sides of the sealing plates.

It is evident that the operator has difficult access to the bands or conveyor hoses that are situated at higher death in this space, since he must reach them from the front of the machine.

Another inconvenience of the packaging machines equipped with sealing plates overturned around a horizontal axis is represented by the difficulties encountered when the plate is in horizontal position to operate near the rear edge of the sealing plate, with the operator positioned in front of the plate.

In other words, the operator must stretch his arms above the plate to reach the operation points, with particular difficulties for points that are situated far away from the front edge of the plate.

This inconvenience is worsened in case of higher height of the horizontal plane on which the sealing plates are laid, since it cannot be lowered as desired, due to the fact that other operating units must be positioned under the sealing station, such as the transversal cutting unit, an additional transversal sealing unit, and the elements used to unload and manipulate the bags to convey them to the boxing stations.

After examining the inconveniences of the bag packaging machines of known type, an improved version of these machine has been devised, free from the aforementioned drawbacks.

More precisely, the main purpose of the present invention is to provide an improved bag packaging machine characterised by vertical intermittent operation, able to offer the operator large comfortable access to the internal space of the sealing station after overturning the sealing plates in maximum opening position.

A further purpose of the present invention is to provide an improved bag packaging machine characterised by vertical intermittent operation, able to offer the operator comfortable access to the points located near the rear edge of the sealing plates after overturning the sealing plates in maximum opening position.

Finally, a further purpose of the present invention is to provide an improved bag packaging machine characterised by vertical intermittent operation, able to offer comfortable work conditions during cleaning or manipulation of the sealing tools.

The inventive solution that has permitted to achieve all the aforementioned purposes consists in the adoption of sealing plates that can be overturned with respect to a tilted pivoting axis sloping towards the front of the machine and contained on a vertical plane parallel to the plane on which all the parallel lines of bags are laid and moved.

The inclination angle of the overturning axis of the sealing plates generates the double spreading of the sealing plates when they are moved apart from the work position, in which they are close and perfectly vertical, in such a way that the sealing tools are situated in a symmetrically opposed position with respect to the vertical plane on which all the parallel lines of bags are laid and moved.

The first spreading takes place with respect to a horizontal direction with book-type opening, and the second spreading takes place with respect to a vertical direction with stretched-arm type opening, in such a way that the two support planes of the sealing tools are given the configuration of a pair of tilting slides that diverge towards the front of the machine.

In view of the above, when the two sealing plates are open, the parallel series of conveyor hoses and the parallel lines of bags are contained inside a space with gradually increasing width from the bottom to the front of the machine, thus favouring the operator's access and action when the same is positioned on the front of the machine.

For purposes of clarity the description of the bag packaging machine of the invention continues with reference to the enclosed drawings, which are intended for purposes of illustration only and not in a limiting sense, whereby:

FIG. 2 is a left-hand side view partially sectioned with the symmetrical vertical plane Y-Y on the two sealing plates shown in work position;

FIG. 3 is a front view of the unit composed of the two sealing plates in work position, disconnected from the relevant movement parts in order to show the different components of the said unit;

FIG. 4 is a top view of FIG. 3;

Figure 1:
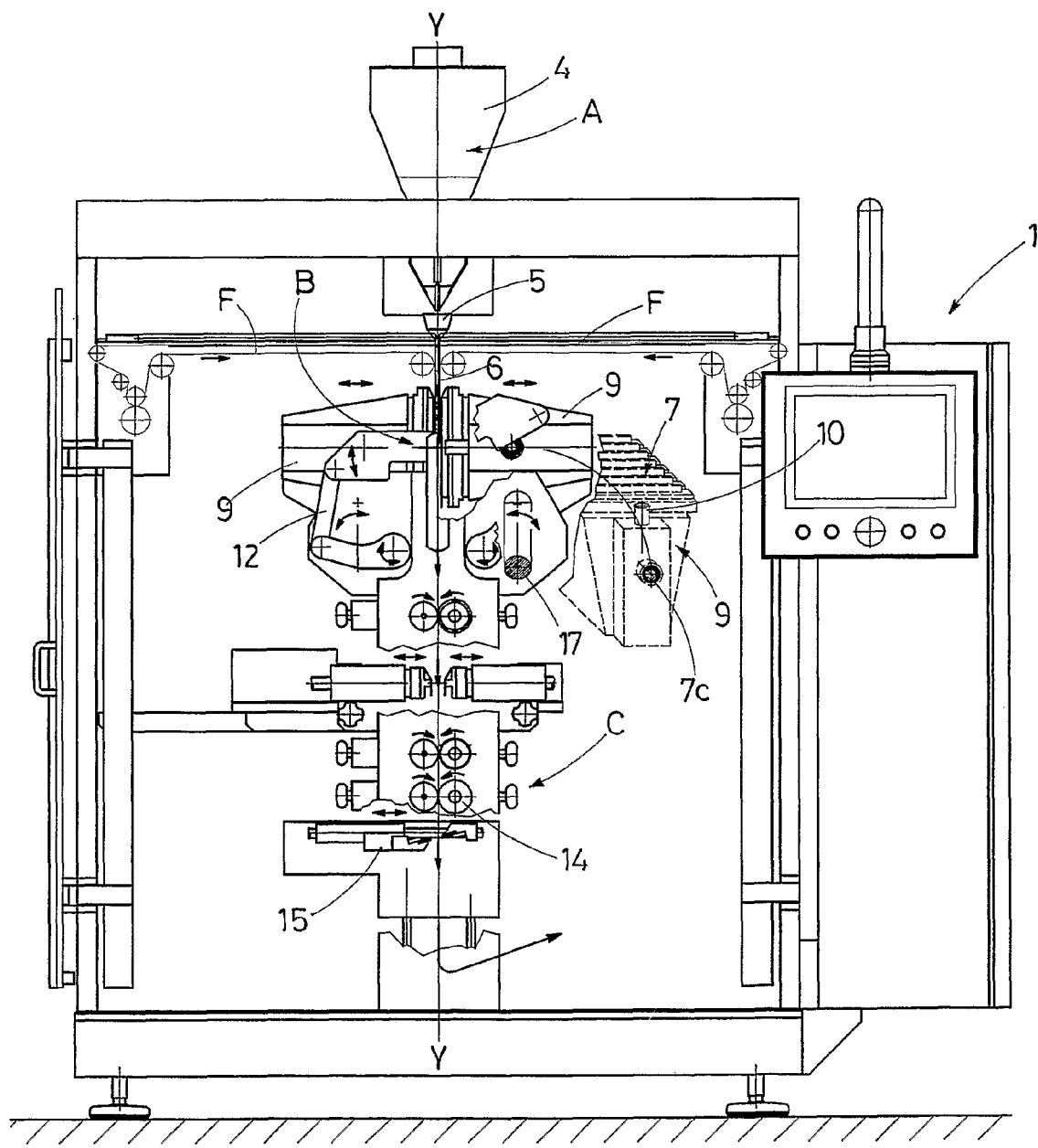
FIG. 1 is a front view of the machine of the invention with the sealing plates in work position, in which the right-hand sealing plate is shown with a broken line in open position on the side.

With reference to FIGS. 1 and 2, the bag packaging machine (1) of the invention comprises three operative units in cascade and precisely a first dosing and filling station (A) for the bags, a second sealing station (B) for the opposite pair of film (F) used to form the bag and a third cutting station (C) for the bags.

The back of the machine (1) supports a coil (2), from which two identical films (F) are unrolled and cut out to form the packaging bags, being conveyed by means of suitable return and overturn rolls onto the symmetrical vertical axis (Y-Y) of the machine (1) on which the films (F) occupy a vertical position one against the other.

The said films pass through the three work stations in this position.

The dosing and filling station (A) comprises dosing and filling means of known type, with hopper (4), dosing devices (5) and conveyor hoses (6) used to bring and discharge the product dose inside the bag.

The machine (1) is equipped with an aligned series of dosing devices (5) combined with corresponding conveyor hoses (6), with each pipe being used to feed one of the several parallel lines of bags obtained by cutting the pair of films along several longitudinal lines.

With special reference to FIGS. 3 and 4, the sealing station (B) comprises a symmetrical pair of sealing plates (7) that support the sealing punches (8) and are supported by corresponding frames (9).

The sealing plates (7) are supported by an opposite pair of slides (7a) inserted in corresponding support and guide bars (10), along which the sealing plates (7) make alternate forward and backward travels to rhythmically move the sealing punches (8) closer and apart.

Figure 5:
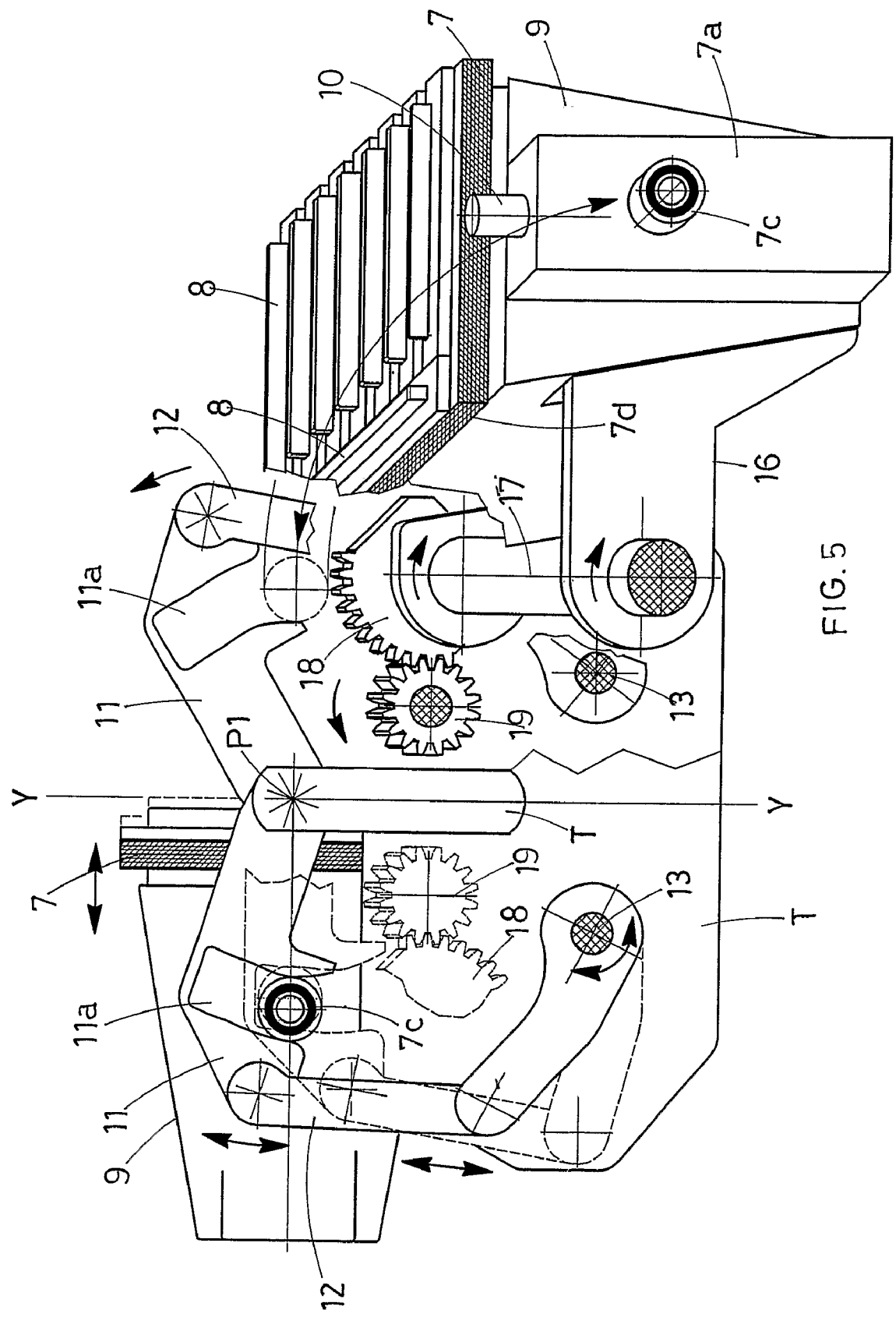
FIG. 5 is a front view of the unit composed of the two sealing plates connected to the relevant movement parts; in this figure the left-hand plate is in work position and the right-hand plate is in maximum opening position on the side.

With special reference to FIG. 5, the movement parts of each sealing plate (7) with respect to the support frame (9) are represented by a rocker (11) pivoted at one end to a fixed point (P1) of the frame (T) of the machine and at the other end to a connecting-rod (12) that is part of a mechanism actuated by an free shaft (13) driven by a brushless motor (13a).

Each rocker (11) is provided with a cam that consists in a profiled notch (11a) in which a bearing (7c) fixed in external position on the slides (7a) is exactly inserted and slides.

The cutting station (C) comprises a parallel series of several pairs or contrarotating disks (14) used to cut the films (F) vertically, thus separating the parallel series of lines (c1, c2 ... cn) of bags (H).

The cutting station (C) also comprises a cutter for the transversal simultaneous cut of all lines of bags, thus cutting the first bag of each line. The main peculiarity of the machine (1) of the invention consists in the fact that the support frame (9) of each sealing plate (7) is fixed to an free shaft (17) with forward inclination by means of two anchoring brackets (16).

Figure 6:
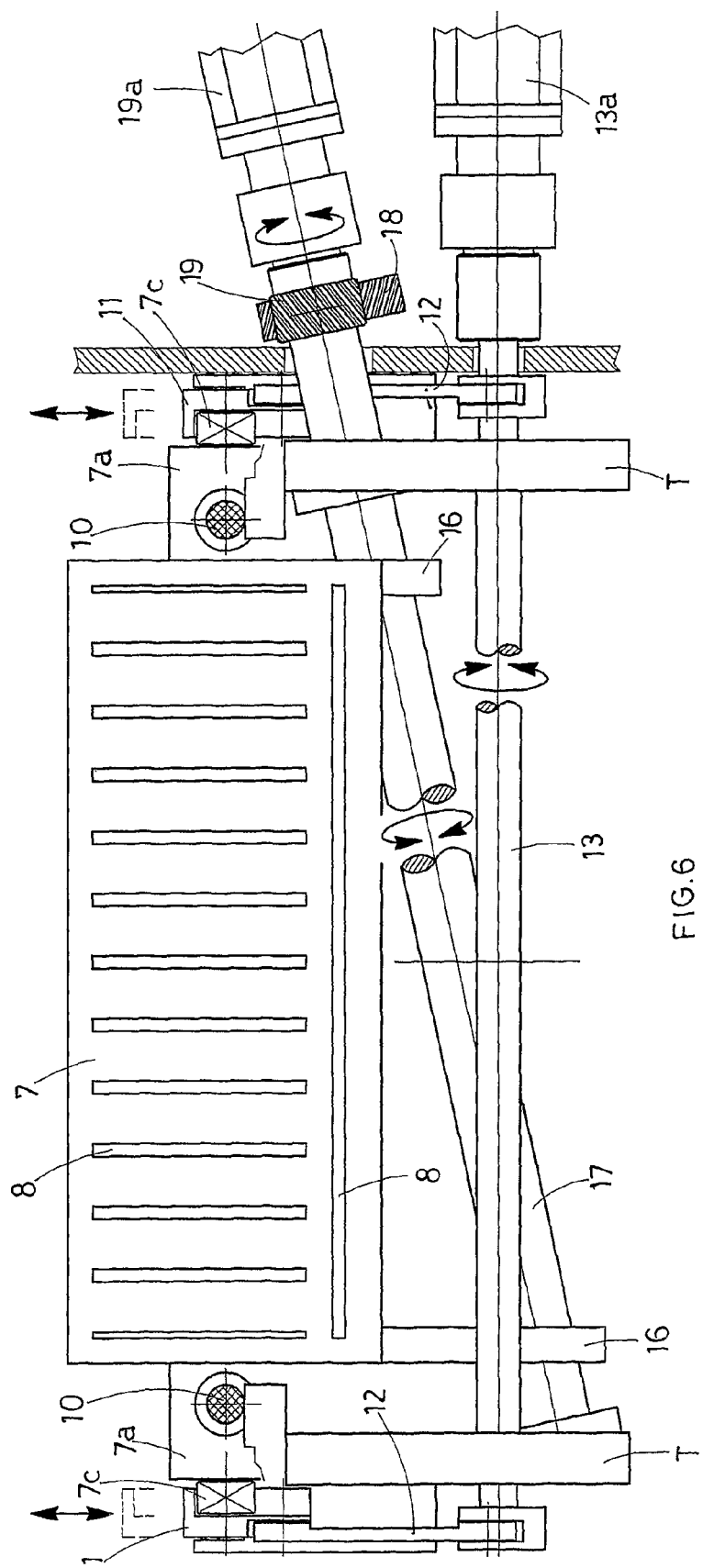
FIG. 6 is a cross-section of FIG. 5 with the symmetrical vertical plane Y-Y.

More precisely, the shaft (17) lays on a vertical plane parallel to the symmetrical vertical axis (Y-Y) of the machine (1), sloping towards the front of the machine (1), as shown in FIG. 6.

The inclination angle is preferably 12°.

A gearwheel (18) is splined on the shaft (17), which engages with a pinion (19) driven by a brushless motor (19a), able to drive the shaft (17) into 90° alternate oscillations, in such a way that the sealing plates (7) occupy two different positions at the end of their travel, as shown in FIG. 5 respectively.

The first position is the work position in which all the sealing punches (8) lay on a vertical plane parallel to the symmetrical vertical plane (Y-Y) of the machine, each of them being perfectly interfaced with the corresponding punch of the opposite sealing plate.

The second position is the idle position in which all the sealing punches (8) lay on a tilted plane with forward inclination; in this position the internal edges (7d) of the sealing plates (7) diverge towards the front, thus providing easier access to the space equipped with conveyor hoses (6) in which the films (F) pass.

Double inclination can be given to the shaft (17) to increase the divergence angle of the said internal edges (7d), with a small divergence angle with respect to the vertical plane parallel to the symmetrical vertical axis (Y-Y) of the machine.

In other words, in addition to forward inclination, the said shaft (17) is laid on a vertical plane that diverges towards the front with respect to the symmetrical vertical axis (Y-Y) of the machine.

Finally, it must be noted that before actuating the motor (19a) to overturn the sealing plates (7) sideways, the rockers (11) must be uncoupled from the bearings (7c), as shown in FIG. 5 for the right-hand sealing plate.

The invention claimed is:

1. Bag packaging machine with vertical intermittent operation, of the type comprising at least a first dosing and filling station (A) for the bags (H), a second sealing station (B) for the opposite pair of films (F) that form the bags (H), a third cutting station (C) for the bags (H), in which the station (B) comprises two sealing plates (7) in opposite position with respect to the symmetrical vertical axis Y-Y of the machine, which support sealing punches (8) and are supported with possibility of free sliding by corresponding frames (9) fixed to free shafts (17) actuated by corresponding motors (19a), machine having a front and a back being characterized in that each shaft (17) extends from the back to the front of the machine and is inclined forward towards the front of the machine (1).

2. Machine as claimed in claim 1, characterized in that each shaft (17) is inclined forward and lays on a vertical plane parallel to the symmetrical vertical axis (Y-Y) of the machine (1).

3. Machine as claimed in claim 1, characterized in that each shaft (17) is inclined forward and lays on a vertical plane diverging towards the front with respect to the symmetrical vertical axis (Y-Y) of the machine (1).

4. Machine as claimed in claim 1, characterized in that the sealing plates (7) are supported by an opposite pair of slides (7a) inserted and sliding in corresponding support and guide bars (10), which are an integral part of the frame (9), along which the sealing plates (7) make alternate forward and backward travels, being driven by suitable movement parts.

5. Machine as claimed in claim 4, characterized in that the said movement parts of each sealing plate (7) are composed of a rocker (11) pivoted at one end to a fixed point (p1) of the frame (T) of the machine and at the other end to a connecting-rod (12) that is part of a mechanism actuated by a free shaft (13) driven by a motor (13a); each rocker (11) has a cam that consists in a profiled notch (11a) in which a bearing (7c) fixed in external position to the slides (7a) is exactly inserted and slides.

* * * * *